United States Patent [19] [11] 4,142,555
Satake et al. [45] Mar. 6, 1979

[54] CORROSION PREVENTIVE, COATED METAL PIPE

[75] Inventors: Jiro Satake; Tetsuzo Arai, both of Amagasaki; Yoshifumi Miyamoto, Kobe; Hiroo Inoue, Nishinomiya, all of Japan

[73] Assignee: Sumitomo Kinzoku Kogyo Kabushiki Kaisha, Osaka, Japan

[21] Appl. No.: 852,000

[22] Filed: Nov. 15, 1977

Related U.S. Application Data

[63] Continuation-in-part of Ser. No. 756,564, Jan. 3, 1977, abandoned.

[30] Foreign Application Priority Data

Jan. 19, 1976 [JP] Japan ................................. 51-5315

[51] Int. Cl.² .................................................. F16L 9/14
[52] U.S. Cl. ................................... 138/143; 138/145; 138/153; 138/DIG. 6; 138/DIG. 7
[58] Field of Search ............... 138/145, 143, 144, 146, 138/140, 141, DIG. 6, DIG. 7, 153, 124; 427/29.2, 203, 204, 205, 409, 425, 426; 428/36, 241, 242, 245; 260/859 R; 156/192, 297, 298, 429

[56] References Cited

U.S. PATENT DOCUMENTS

| | | | |
|---|---|---|---|
| 3,170,489 | 2/1965 | Cunningham | 138/145 |
| 3,420,277 | 1/1969 | Ceintrey | 138/143 |
| 3,527,146 | 9/1970 | Garling | 260/859 R |
| 3,532,132 | 10/1970 | Rubenstein | 138/141 |
| 3,877,490 | 4/1975 | Tsubonchi et al. | 138/145 |

Primary Examiner—Lenard A. Footland
Attorney, Agent, or Firm—Ladas, Parry, Von Gehr, Goldsmith & Deschamps

[57] ABSTRACT

There are applied in layers on the surface of a metal pipe, a rapid hardening and cure type corrosion preventive material consisting essentially of isocyanate terminated polyurethane prepolymer, amine base hardener and petroleum resin, and a reinforcing material consisting of silica sand, blast furnace slag or the like. Thus there are provided a plurality of coatings or layers on the metal pipe, which are excellent in impact resisting and corrosion preventive properties.

13 Claims, 3 Drawing Figures

CORROSION PREVENTIVE, COATED METAL PIPE

BACKGROUND OF THE INVENTION

This patent application is a continuation-in-part of our prior application Ser. No. 756,564 filed Jan. 3, 1977 now abandoned.

This invention relates to a metal pipe, and more particularly to a corrosion preventive, coated metal pipe having coatings on its surface for protecting itself from changes in atmosphere and environment.

The present invention is further associated with mastic type strong coatings on a metal pipe, which coatings consist of a corrosion preventive material and reinforcing material.

It has been a general practice to apply coal tar enamel asphalt and asphalt enamel on the surface of a metal pipe, particularly a steel pipe for the purpose of corrosion prevention. However, these coatings are still short of desired physical properties such as hardenability at a relatively low temperature, brittleness, impact resisting property, adhesiveness and the like, thus suffering from many troubles. In addition, such bituminous materials pose difficulties in heating and melting, before coating, and requires skill in applying coatings, in addition to generation of irritating odor or gases. Tar epoxy coating which has been often used in this field is slow in hardening and thus requires a long period of time before handling a dried coated pipe, impairing operational efficiency and economy.

SUMMARY OF THE INVENTION

It is the first object of the present invention to provide a corrosion preventive coated metal pipe by using a rapid hardening and drying cure type corrosion preventive material, thereby accelerating a hardening speed, shortening the time from coating until handling of a dried pipe, and hence improving coating efficiency and economy, and which is free of heating and melting operations, and generation of irritating gases and odor, as when bituminous material or agent is used.

It is the second object of the present invention to provide a corrosion preventive coated metal pipe, in which a reinforcing material such as silica sand, blast furnace slag or the like is applied to form a layer thereon, thereby providing coatings having improved impact resisting and abrasion resisting properties as well as improved coating strength.

It is the third object of the present invention to provide a corrosion preventive, coated metal pipe, in which there are provided in layers a plurality of coatings on the surface of a metal pipe, which coatings consist of a corrosion preventive material and a reinforcing material, in an attempt to utilize respective inherent advantages of those materials as well as their interacting effects, thus achieving desired physical properties at a low temperature, ease of manufacture and economy.

These and other objects and features of the present invention will be apparent from a reading of the ensuing part of the specification in conjunction with the accompanying drawings which indicate embodiments of the invention.

DESCRIPTION OF THE PREFERRED EMBODIMENTS

Figure 1:
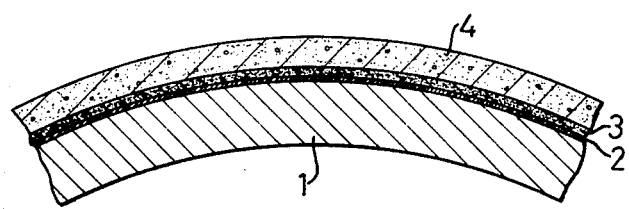
FIG. 1 is a partial cross sectional view of layers of a corrosion preventive material on a primer coated metal pipe and a composite material of corrosion preventive material and reinforcing material thereon.

The present invention relates to a corrosion preventive coated metal pipe comprising:
(a) a corrosion preventive material containing;
(1) a first ingredient consisting essentially of isocyanate terminated polyurethane prepolymer formed from the reaction of polyether polyol with polyisocyanate,
(2) a second ingredient consisting essentially of (i) amine base hardener and (ii) petroleum resin formed by polymerizing by heating the fraction of distillate of an unsaturated petroleum base hydrocarbon in the presence of a suitable catalyst, the carbon number of said hydrocarbon being essentially $C_4$ to $C_5$,
said first ingredient and second ingredient being mixed directly prior to coating,
(b) a reinforcing material of at least one kind selected from the group consisting of silica sand, blast furnace slag, and synthetic or natural resin of a solid particle type,
said corrosion preventive material and said reinforcing material being coated on said metal pipe to form a plurality of coating layers thereon.

The corrosion preventive material which constitutes a part of the invention contains the first and second ingredients as described above and is believed to be classified within the range of a rapid hardening urethane resin coating. The first and second ingredients are mixed just before the coating and coated by an airless spray gun on the surface of the metal pipe, as described more detail hereinafter. The corrosion preventive material is hardened in about 15 to 180 seconds, normally 30 to 120 seconds. The rapid hardening property of the material is quitely advantageous in the coating operation, resulting in reduction in handling time. In a conventional art which employs the bituminous material, the heating and melting operations are required at the time of coating, while in the present invention such operations are dispensed with, and accordingly the present invention is free from generation of irritating odor or gases.

The first ingredient, i.e., isocyanate terminated polyurethane prepolymer is an reaction product of polyether polyol and poly-isocyanate, and whose content of isocyanate is preferably in the range from 3 to 10% by weight and molecular weight from 800 to 1700. In case the content of isocyanate is less than 3% by weight, the reaction rate and the hardening rate become slower, and thus the coating efficiency is not promoted sufficiently. Further in case the content of isocyanate is more than 10% by weight, the hardening rate and viscosity are increased too high to give the desired operation efficiency. Isocyanate terminated polyurethane prepolymer is commercially available in for example "Orester LP 2309" or "X-9-2746LP" both manufactured by Mitsui Toatsu Kagaku Kogyo Kabushiki Kaisha.

Amine base hardener contained in the second ingredient may be for example, 4-4'-diamino-diphenyl-methane, or 3-3'-dichloro-4-4'-diamino-diphenyl-methane and is available in "Orester X-9-2474D" or "X-9-2310AD" both manufactured by Mitsui Toatsu Kagaku Kogyo Kabushiki Kaisha.

The petroleum resin contained in the second ingredient is a polymer which is formed by heating and polymerizing the distillate fraction of unsaturated petroleum base hydrocarbon in the presence of a suitable catalyst, the carbon number of said hydrocarbon being essentially $C_4$ to $C_5$. The petroleum resin is commercially available in "Petrozin" from Mitsui Sekiyu Kagaku Kogyo Kabushiki Kaisha, "Winston" from Nihon Zeon Kabushiki Kaisha, "Piccorateck" from Esso Standard Kabushiki Kaisha, "Tarklon" from Yoshihara Seiyu Kabushiki Kaisha, or "Sintalon" from Tokyo Jushi Kabushiki Kaisha. The second ingredient contains preferably 25 to 38 parts by weight of the amine hardener and 20 to 40 parts by weight of the petroleum resin, per 100 parts by weight of isocyanate terminated polyurethane prepolymer. Where the amount of the amine hardener is less than 25 parts by weight, hardening is not sufficiently promoted, while where the amount is more than 38 parts by weight, hardening is too much promoted. In addition the latter case is not desired from the viewpoint of economy. Further, where the amount of the petroleum resin is less than 20 parts by weight, the coating composition shows poor waterproof property, while there more than 40 parts per weight, anti-coldness and flexibility of coated layer is undesirably decreased.

In the second ingredient, 1 to 15 parts by weight of pigment and 25 to 45 parts by weight of filler material may be included as necessary, per 100 parts by weight of isocyanate terminated polyurethane prepolymer. The pigment is used just for colouring and usually gives little substantial effect to the property of the composition. The filler material is used for improving the impact resisting property. Use of the filler material in an amount greater than defined results in an excessive increment of water absorbability in the composition, while use of an amount less than defined results in unsatisfactory impact resisting property in the composition. The pigment may be carbon, $Fe_2O_3$, $TiO_2$ or the like. The filler material may be talc, silica, mica or the like.

With respect to the mixing ratio of the first ingredient to the second ingredient, it is determined by the content of amine base hardener contained in the second ingredient relative to that of isocyanate radical contained in the first ingredient.

On the other hand, a reinforcing material as used herein should improve impact resisting and abrasion resisting properties and strength of coatings, and in this sense, silica sand, blast furnace slag, powdered waste plastics and the like may be used. However, other materials may be adopted as required, taking into considerations the aforesaid requirements and usage, performance and economy.

The blast furnace slag is produced when pig iron is produced in a blast furnace. After the slag is cooled and solidified, the slag is crushed to given grain sizes adapted for use as a reinforcing material.

The composition of blast furnace slag is generally 25 to 40% $SiO_2$, 8 to 18% $Al_2O_3$, 32 to 45% CaO, and balance Fe, FeO, MgO, $TiO_2$, Mn, P and the like. The grain sizes of blast furnace slag depend on a desired thickness of a coating and a diameter of a steel pipe, generally ranging from 10 to 150 meshes. On the other hand, the sizes of silica sand depend on the usage, thickness of coating and the like.

Meanwhile, for protecting the outer surface of a coated steel pipe, there may be used a polyethylene sheet or tape wound around the outer surface of a steel pipe, or glass cloth or jute which is impregnated with the corrosion preventive material of the present invention, and then bonded to the outer surface of the steel pipe.

Upon application of coating the first ingredient consisting essentially of isocyanate terminated polyurethane prepolymer and the second ingredient containing amine base hardener and petroleum resin are fed under pressure through separate systems, and mixed within a two headed spray gun immediately prior to spraying.

It is recommendable for the application of a coating to the surface of a steel pipe or the like to apply shotblasting or primer to the surface of a steel pipe for improved adhesion.

In case a steel pipe is a tubular shape, a coating may be applied to the outer surface of a steel pipe by rotating at a given peripheral speed in one direction, so that uniform thickness of coating may be achieved. Meanwhile, an attempt for mixing the first ingredient with the second ingredient beforehand is not recommendable, because the corrosion preventive material employable in the present invention should be of a rapid hardening and drying cure type, and thus if mixed, the two ingredients are rapidly solidified, and no longer usable.

According to the present invention, the corrosion preventive material is applied to a given thickness directly to the surface or to the primer-applied surface of a metal pipe according to a spraying method, and then a reinforcing material is applied thereon. The above cycle of operations are repeated as required, thereby achieving a corrosion preventive layer or coating of a given thickness.

Meanwhile, it is recommendable that the surface of a metal pipe covered directly with the corrosion preventive material. This is because, if not, a reinforcing material would be peeled from the surface of a metal pipe, when the reinforcing material directly covers the surface of the pipe.

Referring to FIG. 1, there is shown a procedure of operation according to the present invention. Firstly, primer 2 is applied to the surface of a steel pipe 1, and then corrosion preventive material 3 thereon, and a composite material 4 consisting of a corrosion preventive material and reinforcing material are in turn applied thereon.

Figure 2:
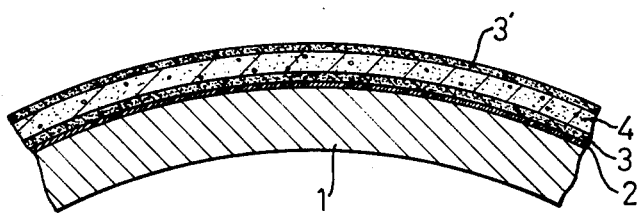
FIG. 2 is a partial cross sectional view of layers of a corrosion preventive material on a primer coated metal pipe, a composite material of corrosion preventive material and reinforcing material thereon and further a corrosion preventive material thereon.

A boundary between the layer of a corrosion preventive material and the layer of a composite material is not distinct. It is because upon spraying through a double headed spray gun, the spraying of a corrosion preventive material is applied somewhat earlier than is a composite material, so that the coating of a corrosion preventive material is formed as an underlayer. If the corrosion preventive coating is not laid as an underlayer, then the corrosion preventive effect is impaired to some extent. FIG. 2 shows a further improved application of coatings. A corrosion preventive material 3' is further applied on the composite layer, thereby enhancing a corrosion preventive effect.

Figure 3:
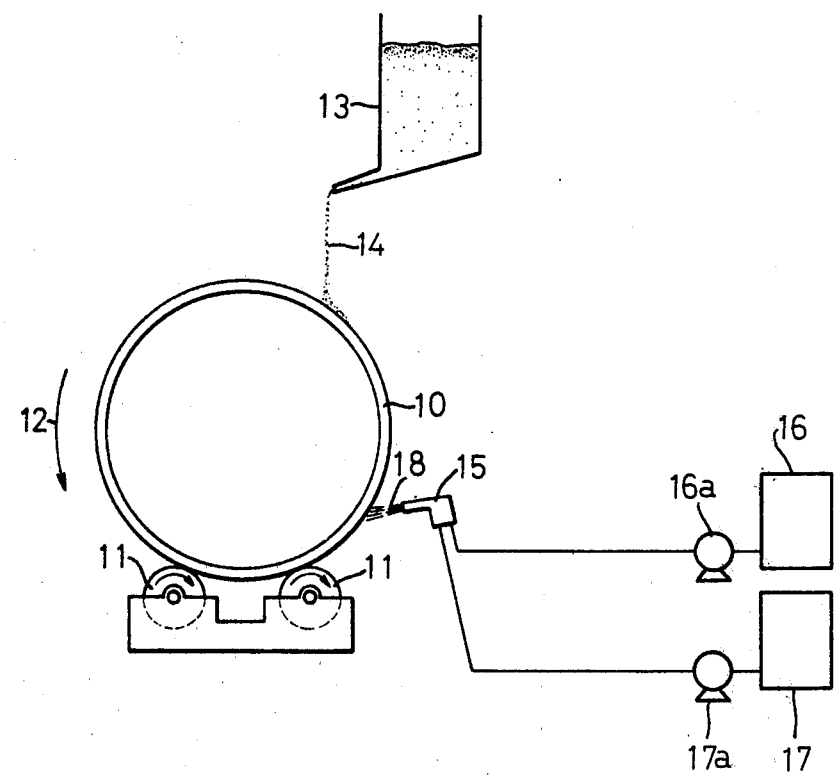
FIG. 3 is an outline of a coating apparatus.

FIG. 3 shows an apparatus best suited for forming desired coatings according to the present invention.

Description will be given to the case of a steel pipe. A steel pipe 10 is rotated in the peripheral direction and, to this end, the steel pipe 10 is placed on rollers 11, 11 which are positioned to the right and left, respectively, as viewed in the drawing, and rotating in the same direction, say in an arrow direction 12. A reservoir 13 storing a reinforcing material therein is positioned above the steel pipe 10, and a reinforcing material 14 is supplied onto the steel pipe 10. A double headed spray gun 15 is positioned upstream of the reservoir 13 and directed towards the surface of the steel pipe 10, taking into consideration a direction of the rotating steel pipe 10. The double headed spray gun 15 is communicated with a reservoir 16 containing the aforesaid first ingredient, as well as with another reservoir 17 containing the aforesaid second ingredient, so that the first and second ingredients fed from pumps 16a, 17a may be mixed with each other within the gun. Thus, a mixture i.e., corrosion preventive material 18 is sprayed through the gun 15 onto the surface of the steel pipe 10.

With the aforesaid coating apparatus, a continuous application of coatings is possible and the apparatus is well adapted for use in the application of a rapid hardening and cure type corrosion preventive material.

A test was given to investigate the characteristic of a corrosion preventive material alone, which is used in the present invention. The following first and second ingredients were applied to the surface of a metal pipe to a thickness (when dried) of 250 to 300 u by using a double headed spray gun, and then dried at room temperature for seven days:

| | | |
|---|---|---|
| the first ingredient; | isocyanate terminated polyurethane prepolymer | - 100.0 parts by weight |
| the second ingredient; | amine base hardener | - 30.0 parts by weight |
| | petroleum resin | - 33.7 |
| | pigment | - 3.0 |
| | filler material | - 33.3 |

The samples thus prepared were tested according to the specification, JIS K-5664 set forth for a tar epoxy coating material. Good results were obtained, as shown in Table 1.

TABLE 1

| ITEM | SPECIFICATION | RESULTS |
|---|---|---|
| Condition in vessel | No clod of a base agent and hardener shall not be present but the condition shall be uniform. | Uniform |
| Adaptability to mixing | Mixing shall be uniform | Mixed uniformly |
| Operation ability | No obstacle in air-less spraying | No obstacle in spraying through a double headed spray gun. |
| Dryness | Within 24 hours | 2 to 3 minutes according to finger touch, 10 20 minutes before dried and hardened |
| Appearance of coating | Appearance of coating | Black |
| Pot life | Over 3 hours of a life | No limitation because of the use of a double headed spray gun |
| Flexibility resisting property | Shall withstand bending along the periphery of a round bar of 10mm diameter | Coatings could withstand bendings around a round bar of 6mm diameter |
| Impact resisting property | When a weight of 500g is dropped from the high of 300mm, no cracking and peeling | When a weight of 500g is dropped from the hight of 500mm, a coating could withstand the impact. |

TABLE 1-continued

| ITEM | SPECIFICATION | RESULTS |
|---|---|---|
| | shall occur due to an impact | stand the impact. |
| Cooling-heating repeating test | A cycle of cooling and heating between −20° C. and 80° C. is applied three times, and then no defect shall be found in the coating | After 6 cycles, no defect was found |
| alkali resisting property | After immersion in a sodium hydroxide solution (5w/v%, 168 hrs) no defect shall be found | Afer immersion for 336 hours (14 days), no defect was found |
| Acid resisting property | After immersion into a sulfuric acid solution (5w/v%, 168 hours), no defect shall be found | After immersion for 336 hours, no defect was found |
| Volatility | After immersion in a test No. 3 volatile oil for 48 hours, no defect shall be found | No defect |
| Salt spray test | After being subjected to a salt spray test for 120 hours, no defect shall be found | Coatings could withstand a test for 336 hours |
| Humidity resisting property | After being subjected to humidity test at 50±1° C, a humidity of over 95% for 120 hours no defect shall be found | Coatings could withstand a test for 336 hours |
| 3% salt water resisting property | — | After immersion at room temperature for 168 hours (7 days), and then immersion at 60° C for 168 hours, no defect was found |

EXAMPLE I

The outer surface of a steel pipe (inner diameter of 600mm) was shot-blasted for removing scales therefrom and then commercially available urethane wash primer was applied thereto to a minimized thickness, and dried. Then, the corrosion preventive material shown in Table 2 hereinbelow was applied by using a double headed spray gun to a thickness of 500μ (thickness in a wet condition), and then a powdered blast furnace slag of a given particle size of 30 to 100 meshes was applied thereto uniformly. Thereafter, the aforesaid corrosion preventive material was applied to a thickness of 1000μ (thickness in a wet condition), then dried at a room temperature, thereby obtaining a corrosion preventive coating.

TABLE 2

| | Ingredient | Mixing ratio (parts by weight) |
|---|---|---|
| First Ingredient | Isocyanate terminated polyurethane prepolymer (Orester-LP2309) | 100.0 |
| Second Ingredient | Amine base hardener (Orester X-9-2747AD) | 30.0 |
| | Petroleum resin (Petrozin) | 33.7 |
| | Pigment (Carbon) | 3.0 |
| | Filler material (Talc) | 33.3 |

The coated steel pipe thus prepared was dried for two minutes in terms of finger touch, and may be moved or installed after 15 minutes. There results an improved operation efficiency and efficient manufacture of coated steel pipes.

These coated steel pipe were allowed to stand for curing for 7 days at a room temperature, and then a pin hole test was given thereto at an impressed voltage of 10,000V. It was proved that there was no pin hole in the coatings on the steel pipes, presenting good results.

Thereafter, a coating insulating resistance test was given to samples immersed in water in terms of the time progress.

After one year, the insulation resistance as high as $10^{12}\Omega$ cm was obtained.

EXAMPLE II

The outer surface of a steel pipe (inner diameter of 1000mm) was shot-blasted for removing scales therefrom and then commercially available epoxy base primer was applied thereto to a minimized thickness and then pipe was dried. Then, the corrosion preventive material shown in Table 3, (1)–(3) were applied to pipes to a thickness of 700$\mu$ (thickness in a wet condition), and then powder consisting commercially available silica sand or blast furnace slag was applied thereto uniformly. Thereafter, the aforesaid corrosion preventive materials were applied to a thickness of 800$\mu$ (thickness in a wet condition) and then dried at a room temperature.

TABLE 3

| Experiment No. | Constituents of Coatings (parts by weight) | |
|---|---|---|
| (1) | First ingredient | |
| | Isocyanate terminated polyurethane | |
| | prepolymer (X-9-2746LP) | 100.0 |
| | Second ingredient | |
| | Amine base hardener (X-9-2310AD) | 30.0 |
| | Petroleum resin(Piccorateck) | 33.7 |
| | Pigment(Fe$_2$O$_3$, Carbon) | 3.0 |
| | Filler material(TiO$_2$, Silica) | 33.3 |
| | Reinforcing material (No. 5 Silica sand) | 300 |
| (2) | First ingredient | |
| | Isocyanate terminated polyurethane | |
| | prepolymer(X-9-2746LP) | 95.0 |
| | Second ingredient | |
| | Amine base hardener(X-9-2310AD) | 34.0 |
| | Petroleum resin(Piccorateck) | 58.0 |
| | Pigment (Carbon) | 3.5 |
| | Filler materila (Mica) | 38.0 |
| | Reinforcing material(No. 5 Silica sand) | 280 |
| (3) | First ingredient | Same with the experiment No. 1 |
| | Second ingredient | Same with the experiment No. 1 |
| | Reinforcing material (Blast furnace slag, 30 to 100 meshes) | 310 |
| (4) | After coating and drying asphalt primer on a pipe, hot-melt asphalt is coated thereon to a thickness of 5mm | |
| (5) | After coating and drying coal tar primer on a pipe, hot-melt coal tar is coated thereon to a thickness of 5mm | |
| (6) | After coatin and drying coal tar epoxy coating on a pipe, coal tar epoxy coating is coated to a thickness of 700 $\mu$ (wet). Then blast furnace slag of 30 to 100 meshes is diffused thereon, and coal tar epoxy coating is applied to the thickness of 800 $\mu$. | |

In the above table 3, the experiment No. (4) to (6) shows the conventional coatings such as by asphalt or coal tar base coatings.

These steel pipes were allowed to stand at a room temperature for 20 days, and then an impact test as specified in JIS(Japanese Industrial Standard) G-3492 was given thereto, thus obtaining the results shown in Table 4.

TABLE 4

| Experiment No. | Results of Impact Test (peeled area cm$^2$) | |
|---|---|---|
| | Dried for 7 days | |
| | −4° C | −30° C |
| (1) | 0.0 | 0.2 |
| (2) | 1.0 | 4.5 |
| (3) | 0.0 | 0.3 |
| (4) | 20.0 | >65.0 |
| (5) | 35.0 | >65.0 |
| (6) | 2.8 | 4.9 |

As indicated in the Table 4, the coated steel pipes according to the present invention have an excellent impact resisting property in such environments of low temperatures. The coating of the experiment No. 2 in which the petroleum resin is contained in a large amount shows relatively inferior property to the other two of the present invention, but it is still better than the coatings according to the conventional arts, such as asphalt coating coal tar coating, or the like.

EXAMPLE III

The outer surface of a steel pipe (inner diameter of 1200 mm) was shot-blasted for removing scales therefrom. Then commercially available epoxy base primer was applied thereto to a minimized thickness, and dried.

Two pipes were prepared with such treatment for the experiment hereinunder. The corrosion preventive materials prepared according to the example (1) and (2) of the Table 5 were respectively applied to a thickness of 700$\mu$ (thickness in a wet condition) to each steel pipe. Thereafter, commercially available No. 5 silica sand was applied uniformly. Then, a corrosion preventive material was applied to a thickness of 800$\mu$ (thickness in a wet condition), and dried at a room temperature. These coated steel pipes were allowed to stand at a room temperature for 20 days, after which the pipes were dipped in 3% salt water for 6 months, followed by measurement of an extent of water which made ingress into between the steel surface and the coating from the edge of the pipe.

TABLE 5

| Ingredients | Mixing Example (1) | Mixing Example (2) |
|---|---|---|
| First ingredient | (parts by weight) | |
| Isocyanate terminated polyurethane prepolymer (Orester LP 2309) | 87.0 | 97.0 |
| Second ingredient | | |
| Amine base hardener(X-9-2747AD) | 22.0 | 21.0 |
| Petroleum resin(Petrozin) | 30.0 | 18.0 |
| Pigment($Fe_2O_3$) | 3.0 | 3.5 |
| Filler material (Talc, Mica) | 50.0 | 38.0 |

The extent or length of water ingress from an edge of a steel pipe into between the surface of the pipe and the coating thereon prepared according to the example (1) was 0 to 2mm. In contrast thereto, the extent of water engress from an edge of a steel pipe into between the surface of the pipe and the coating prepared according to the example (2) was 7 to 15mm, exhibiting considerably long extent of water ingress. Accordingly, it is understood that such small amount of the petroleum resin contained leads the property of the coating to the worse.

What is claimed is:

1. In metal pipes coated with layers of corrosion preventive material and reinforcing material selected from the group consisting of silica sand, blast furnace slag, and synthetic or natural resin of a solid particle type, wherein the improvement comprises a corrosion preventive material containing:
   (1) a first ingredient consisting essentially of isocyanate terminated polyurethane prepolymer formed from the reaction of polyether polyol with polyisocyanate, and
   (2) a second ingredient consisting essentially of (i) amine base hardener and (ii) petroleum resin formed by heating and polymerizing the fraction of distillate of an unsaturated petroleum base hydrocarbon in the presence of a suitable catalyst, the carbon number of said hydrocarbon being essentially $C_4$ to $C_5$, said first ingredient and second ingredient being mixed prior to coating.

2. A corrosion preventive, coated metal pipe as set forth in claim 1, wherein the lowermost layer of said coating is a corrosion preventive material.

3. A corrosion preventive, coated metal pipe as set forth in claim 1, wherein the lowermost layer of said coatings is a corrosion preventive material and the layer thereabove is a reinforcing material layer.

4. A corrosion preventive coated metal pipe, as set forth in claim 1, wherein the lowermost layer of said coatings is a corrosion preventive material, the layer thereabove is a reinforcing material layer, and the layer still thereabove is a corrosion preventive material.

5. A corrosion preventive coated metal pipe as set forth in claim 1, wherein primer coating is present between the surface of said metal pipe and a coating applied thereto.

6. A corrosion preventive coated metal pipe as set forth in claim 1, wherein said isocyanate terminated polyurethane prepolymer contains isocyanate radical in an amount of 3 to 10 weight % and has the molecular weight of 800 to 1700.

7. A corrosion preventive coated metal pipe as set forth in claim 1, wherein said second ingredient 25 to 38 weight parts of amine base hardener, and 25 to 40 weight parts of petroleum resin, per 100 parts by weight of isocyanate terminated polyurethane prepolymer.

8. A corrosion preventive, coated metal pipe as set forth in claim 1, wherein said second ingredient contains 1 to 15 parts by weight of pigment, and 20 to 45 parts by weight of filler material, per 100 parts by weight of isocyanate terminated polyurethane prepolymer.

9. A corrosion preventive coated metal pipe as set forth in claim 1, wherein said powdered blast furnace slag is made by cooling, solidifying slag from a blast furnace and crushing same into 10 to 150 meshes in a crusher.

10. A corrosion preventive, coated metal pipe as set forth in claim 1, wherein scales on a metal pipe are removed, and/or the surface of said metal pipe are shot-blasted, beforehand.

11. A corrosion preventive coated metal pipe, as set forth in claim 1, wherein the uppermost layer of coatings is a cloth impregnated with said corrosion preventive material for protection of the outer surface of the metal pipe.

12. A corrosion preventive, coated metal pipe as set forth in claim 11, wherein said cloth is a glass cloth or jute.

13. A corrosion preventive coated metal pipe as set forth in claim 1, wherein the uppermost layer of said coatings consists of a sheet or tape for protection of the outer surface of the metal pipe.

* * * * *